United States Patent
Agarwal

(10) Patent No.: US 8,803,712 B2
(45) Date of Patent: Aug. 12, 2014

(54) NAVIGATION SYSTEM WITH MOBILE ENGAGEMENT MECHANISM AND METHOD OF OPERATION THEREOF

(75) Inventor: Nipun Agarwal, Santa Clara, CA (US)

(73) Assignee: Telenav, Inc., Sunnyvale, CA (US)

( * ) Notice: Subject to any disclaimer, the term of this patent is extended or adjusted under 35 U.S.C. 154(b) by 189 days.

(21) Appl. No.: 13/555,646

(22) Filed: Jul. 23, 2012

(65) Prior Publication Data

US 2014/0022096 A1    Jan. 23, 2014

(51) Int. Cl.
*G08G 1/123* (2006.01)
*G06F 17/30* (2006.01)

(52) U.S. Cl.
CPC .... *G06F 17/30867* (2013.01); *G06F 17/30702* (2013.01)
USPC .......................... 340/995.27; 706/45; 709/224

(58) Field of Classification Search
CPC .................... G06F 17/30867; G06F 17/30702; G06F 17/30864
USPC ................... 340/995.27; 706/45, 61; 709/224
See application file for complete search history.

(56) References Cited

U.S. PATENT DOCUMENTS

| | | | |
|---|---|---|---|
| 7,660,815 B1 * | 2/2010 | Scofield et al. | 707/999.102 |
| 7,966,395 B1 * | 6/2011 | Pope et al. | 709/224 |
| 2009/0037355 A1 * | 2/2009 | Brave et al. | 706/45 |
| 2010/0057560 A1 | 3/2010 | Skudlark et al. | |
| 2012/0311139 A1 * | 12/2012 | Brave et al. | 709/224 |
| 2013/0268468 A1 * | 10/2013 | Vijayaraghavan et al. | 706/12 |

* cited by examiner

*Primary Examiner* — John A Tweel, Jr.
(74) *Attorney, Agent, or Firm* — IP Investment Law Group

(57) ABSTRACT

A method of operation of a navigation system includes: collecting a user's pattern; generating a filtered pattern by filtering the user's pattern with a current attribute; generating a mobile engagement score by calculating a weighted average from the filtered pattern and a user's current status; selecting a content based on the mobile engagement score for displaying on a device.

20 Claims, 7 Drawing Sheets

_US 8,803,712 B2_

NAVIGATION SYSTEM WITH MOBILE ENGAGEMENT MECHANISM AND METHOD OF OPERATION THEREOF

TECHNICAL FIELD

The present invention relates generally to a navigation system, and more particularly to a system for mobile users.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Navigation systems and location enabled systems have been incorporated in automobiles, notebooks, handheld devices, and other portable products. Today, these systems struggle to provide relevant usable information, customer service, or products in an increasingly competitive and crowded market place.

Thus, a need still remains for a navigation system able to provide important, germane, and useful information to users. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: collecting a user's pattern; generating a filtered pattern by filtering the user's pattern with a current attribute; generating a mobile engagement score by calculating a weighted average from the filtered pattern and a user's current status; selecting a content based on the mobile engagement score for displaying on a device.

The present invention provides a navigation system, including: a pattern module for collecting a user's pattern; a pattern filter, coupled to the pattern module, for generating a filtered pattern by filtering the user's pattern with a current attribute; a regression module, coupled to the pattern filter, for generating a mobile engagement score by calculating a weighted average from the filtered pattern and a user's current status; and a content correlation module, coupled to the pattern module, for selecting a content based on the mobile engagement score for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
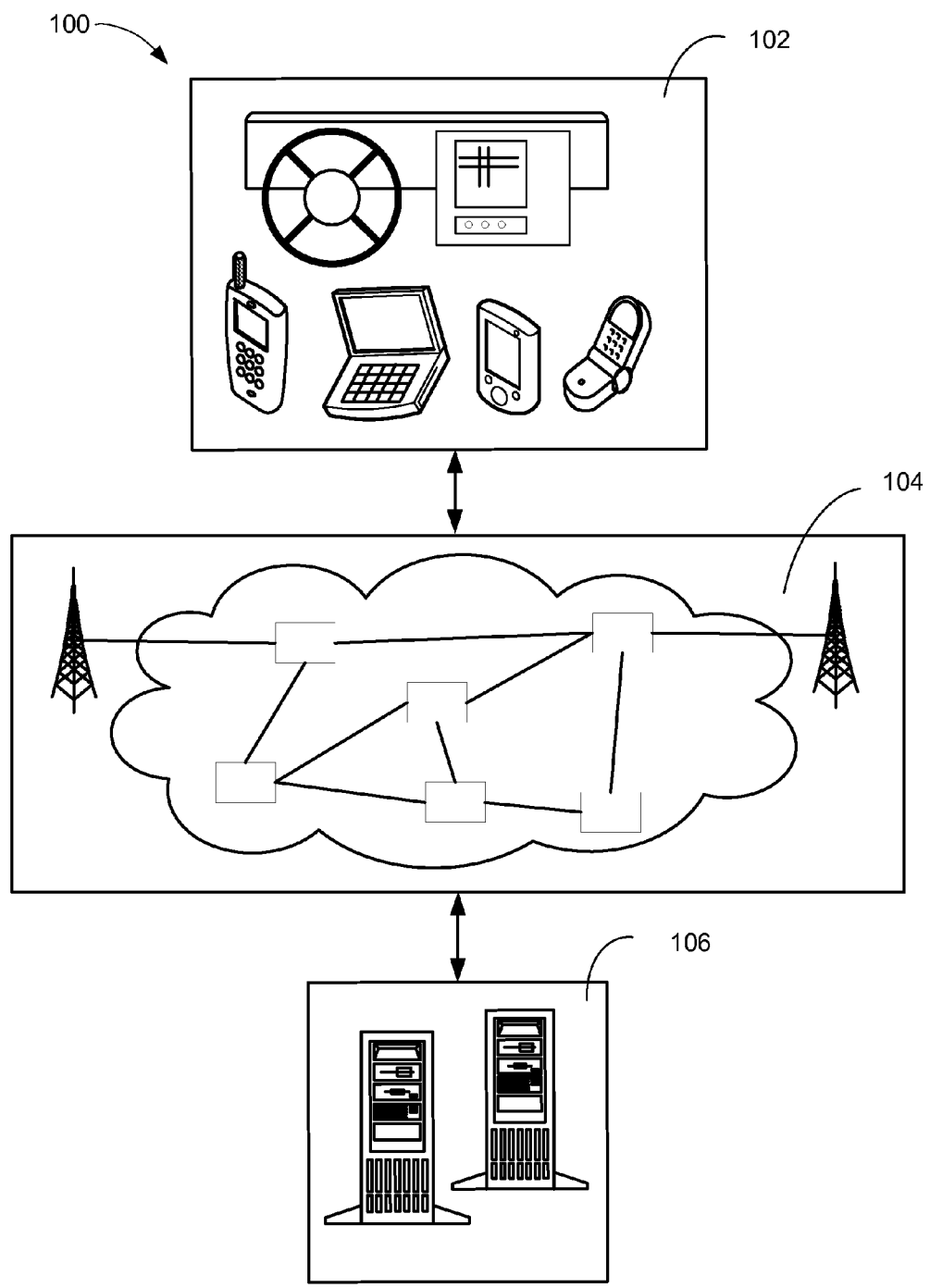
FIG. 1 is a functional block diagram of a navigation system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X,Y), where X and Y are two ordinates that define the geographic location, i.e., a position of a mobile navigation device.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof of the present invention in accordance with the context in which the term is used. For example, the software can be machine code, firmware, embedded code, and application software. Also for example, the hardware can be circuitry, processor, computer, integrated circuit, integrated circuit cores, a sensor, a micro-electro-mechanical system (MEMS), passive devices, or a combination thereof.

Referring now to FIG. 1, therein is shown a functional block diagram of a navigation system 100 in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices and can include global positioning satellite capability, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
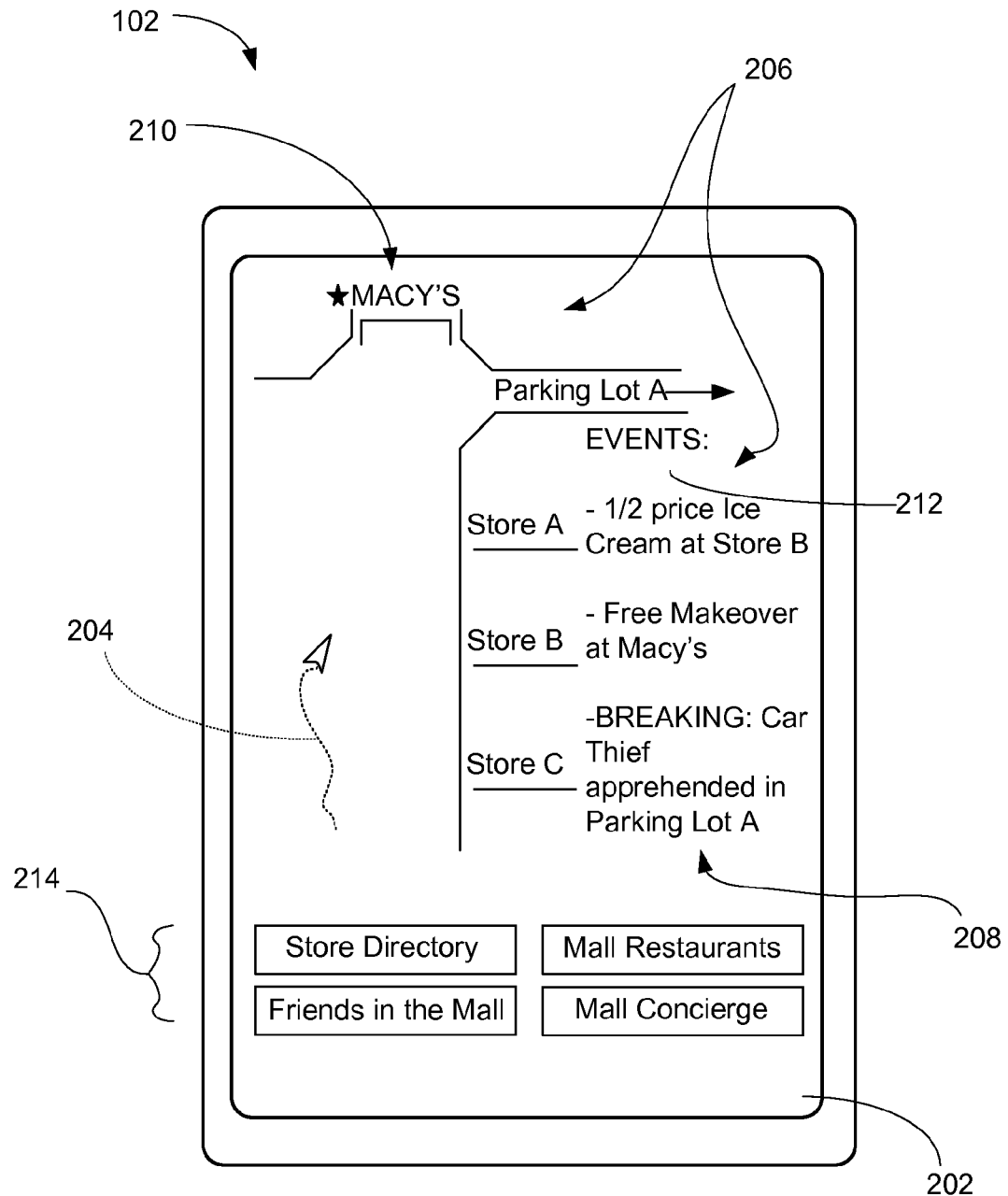
FIG. 2 is a display interface of the first device of FIG. 1.

Referring now to FIG. 2, therein is shown a display interface of the first device 102 of FIG. 1. The first device 102 can include a display 202 that can be an electronic hardware unit that presents the navigation information in a visual, audio, or tactile form such as a display device, a projector, a video screen, or a combination thereof.

The first device 102 can store user's patterns 204. The term "pattern" is the representation of observed data points. The user's patterns 204 can include travel patterns, such as orientation, average speed, distance traveled, variance of speed, device acceleration, observable objects near the location or in line with the orientation, or previous travel.

The user's patterns 204 can also include information consumption patterns, such as search terms, articles read, and previously consumed information. The display 202 of the first device 102 can display content 206 in a format that corresponds to the user's patterns 204 as will be described later.

For example, when the user's patterns 204 indicate that the first device 102 is motionless or having no acceleration, the display 202 can display the content 206 in a dense layout 208 such as lists such as a news feed, bulleted lists, or a column layout. The dense layout 208 can include the content 206 filled within a fixed space of the first device 102. In another example, when the user's patterns 204 indicate that the first device 102 has the user's patterns 204 corresponding to a walking speed of around three or four miles per hour, the content 206 can be displayed in a graphical format 210 and display the content 206 that can be utilized while walking.

For example if the user's patterns 204 of the first device 102 indicate that the location is in a shopping mall at a walking speed, the display 202 can display the content 206 including events 212 that correspond to the orientation of the first device 102. Also, the first device 102 can display a map of the mall including stores that correspond to the orientation and location of the first device 102.

The content 206 can further include linked options 214 that correspond to the user's patterns 204 of the first device 102 and will lead to specific classifications or layouts of the content 206. For example, when the user's patterns 204 indicate the first device 102 is in a mall the content 206 may include the linked options 214 such as links to further information corresponding to the user's patterns 204. The further information corresponding to the user's patterns 204 can be a store directory, mall restaurants, finding friends at the same mall, or a premium upsell option of a mall concierge.

The content 206 is shown as a visual representation, although it is understood that the content 206 can be presented with any visual, audible, or tactile methods. For example, the content 206 can be presented with text, images, audio, video, graphics, vibration, or a combination thereof.

Figure 3:
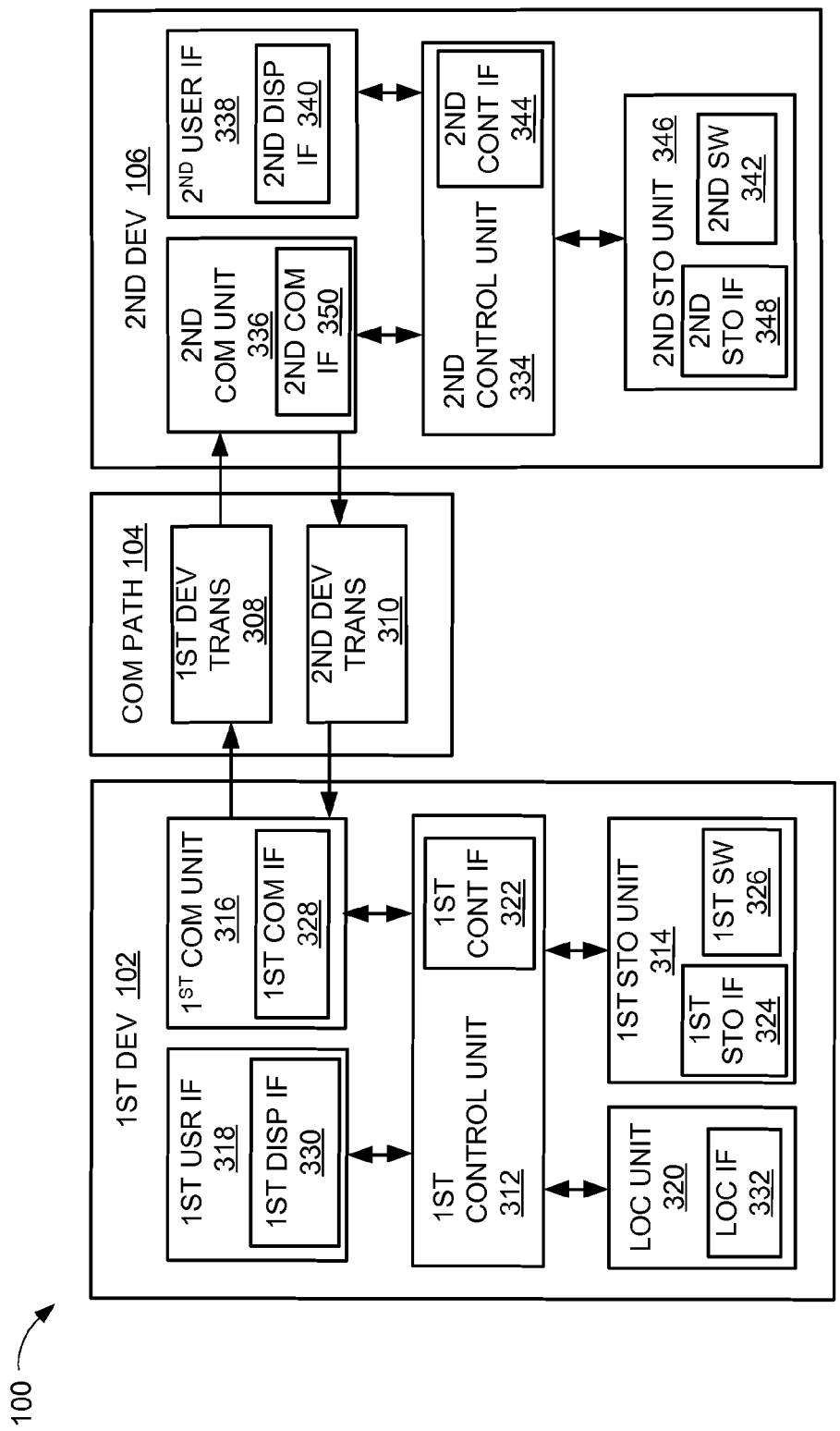
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate from the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations physically separate from the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations physically separate from the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations physically separate from the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
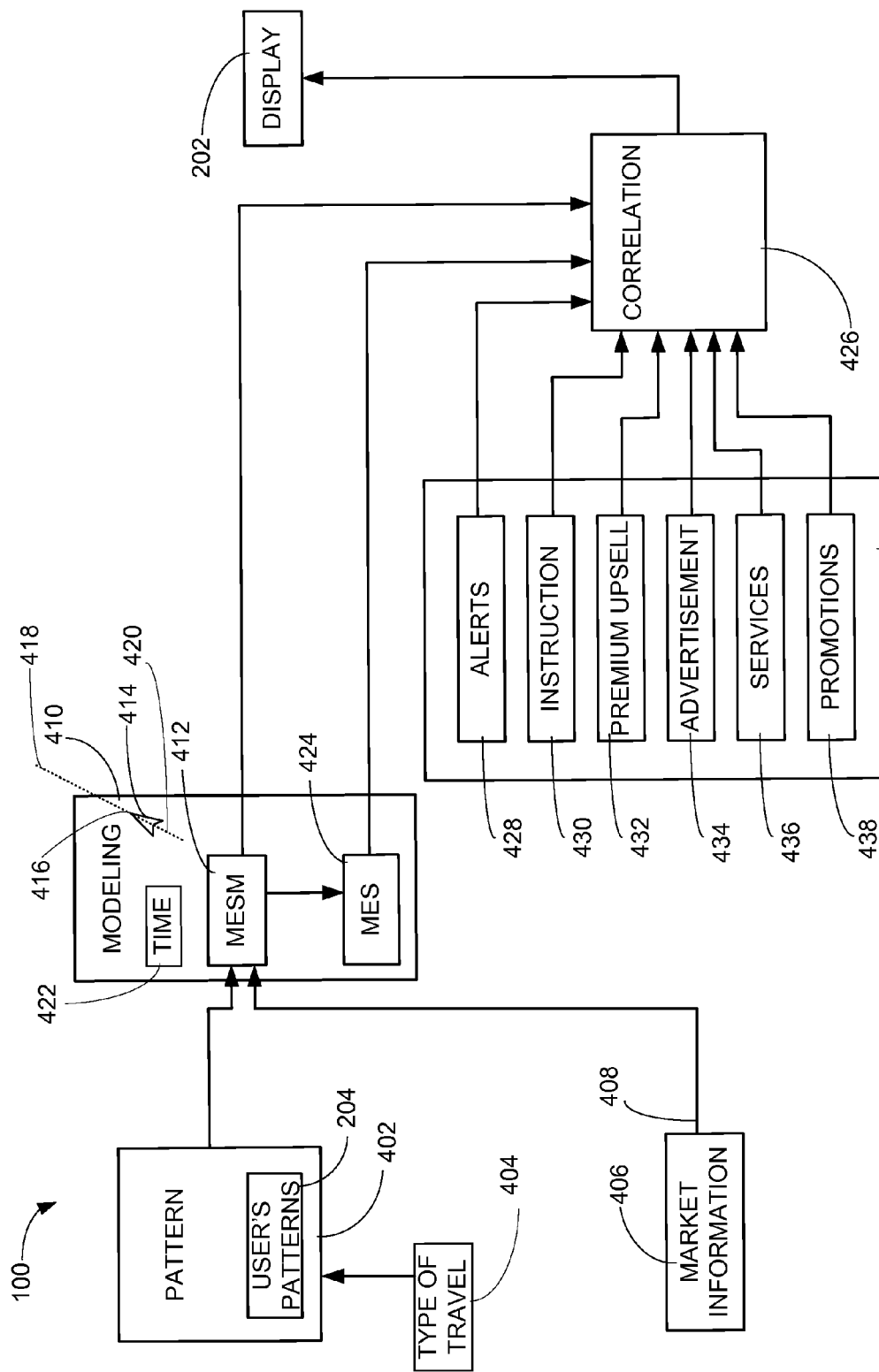
FIG. 4 is a control flow of the navigation system.

Referring now to FIG. 4, therein is shown a control flow of the navigation system 100. The navigation system 100 can include a pattern module 402. The pattern module 402 can operate on the first control unit 312 of FIG. 3. The pattern module 402 collects, calculates, determines, generates, or a combination thereof for the user's patterns 204 of FIG. 2 and stores the user's patterns 204 in the first storage unit 314 of FIG. 3.

The pattern module 402 can also be operated on the second device 106 of FIG. 1 and collects, calculates, determines, generates, or a combination thereof for the user's patterns 204 from the first device 102 of FIG. 1. The pattern module 402 can collect a current location from the location unit 320 of FIG. 3 for the pattern module 402 to further calculate, determine, or generate the user's patterns 204. The pattern module 402 can store and also retrieve information from the first storage unit 314 including: frequency of travel, duration of travel, interval of travel, distance of travel, duration at a place, distance per time period, or a combination thereof.

The pattern module 402 can collect information from the first storage unit 314 further including: frequency of trips per time period, frequency of trips initiated per time period, geo-mapping of places visited per time period, geo-mapping of location in aggregate, or a combination thereof. The information collected by the pattern module 402 can also include a type of travel 404 such as: commuting, non-commuting, walking, biking, public transit, private transportation, driving, size of travel groups, types of destinations, types of routes taken, and departures or detours from a route.

The user's patterns 204 can further include past and present information assessment and usage collected from the first user interface 318 of FIG. 3 the first communication unit 316 of FIG. 3, or the first storage unit 314 such as: frequency of information assessment, duration of assessment, interval of assessment, searches done per time period, frequency of search sessions per time period, or a combination thereof. Past and present information assessment and usage collected by the pattern module 402 can further include: types of information displayed, types of information searched for, terms searched for, price points of search results, points of interest, or a combination thereof. The information collected by the pattern module 402 can also include classification of searches into search categories such as brands, bands, or real estate. Further, the information collected by the pattern module 402 can include post-search interaction such as viewing details, actions taken to view additional information, time taken to view additional information, actions taken after information is viewed, and frustration indicators such as multiple clicks and slower louder speech.

The first device 102 can be operated by a user (not shown) or a user base (not shown). The user base can include subscribed or unsubscribed customers. The user base can also include users of a larger group from customer bases or any of the users of the navigation system 100 or the users of applications running on the first device 102 or the second device 106. The user's patterns 204 collected from the first device 102 can be stored on the first storage unit 314 or in the second storage unit 346 of FIG. 3 and can include the user's patterns 204 over days, weeks, months, and years.

A market information module 406 can output market information. Market information includes market data resulting from market research 408. The market research 408 can include customer survey results, market analysis results, or corporate roadmaps. The market information module 406 can operate or be stored on the first device 102 or the second device 106.

The market information module 406 and the pattern module 402 can be coupled to a modeling module 410. The modeling module 410 can generate a mobile engagement score model 412 based on the inputs from the market information module 406 and the pattern module 402. The mobile engagement score model 412 can be an engagement or consumption recognition model that can be used to forecast, estimate, or determine the usefulness or usability of the content 206.

The pattern module 402 can be coupled to the modeling module 410 through the first communication unit 316 through the communication path 104 of FIG. 1 to the second communication unit 336 of FIG. 3. Alternatively, the pattern module 402 can be coupled to the modeling module 410 within the second control unit 334 of FIG. 3.

The modeling module 410 determines a location 414 and orientation 416 of the first device 102 by communicating with the location unit 320 of the first device 102. The modeling module 410 determines speed 418 and acceleration 420 of the first device 102 by communicating with the location unit 320 of the first device 102 and computing the change in the location 414 over the change in a time 422.

The modeling module 410 collects the user's patterns 204 from the pattern module 402 over the past days, weeks, months, and years. The modeling module 410 computes a statistical value such as the mean, variability, variance, difference, or standard deviation of the location 414, the speed 418, the acceleration 420, and the orientation 416 from the user's patterns 204 of the first device 102.

The statistical value is based on the user's patterns 204 from a range of time of day, week, month or year stored on the first storage unit 314 or the second storage unit 346. The variability, variance, or difference can be a deviation that can be understood as the relatedness of a current action or inaction from the first device 102 with the user's patterns 204 or other devices of the navigation system 100.

The modeling module 410 can collect the user's patterns 204 of multiple devices to generate and augment the mobile engagement score model 412 for all the devices of the navigation system 100. The mobile engagement score model 412 can be generated, for example by regression modeling techniques.

The modeling module 410 can compute the variability, variance, difference, or standard deviation for the location 414, the speed 418, the acceleration 420, and the orientation 416 of the first device 102 in relation to many or all the devices of the navigation system 100. In a similar way the modeling module 410 can calculate the variability, variance, difference, or standard deviation for the first device 102 regarding travel, consumption, information usage, and the location 414, which will be described later.

The modeling module 410 can apply regression techniques to the mobile engagement score model 412 to analyze the relationship between a dependent variable and independent variables related to the user's patterns 204. The modeling module 410 can derive an equation that computes a mobile engagement score 424 as a weighted average of various components of the mobile engagement score model 412 based on the user's patterns 204.

The mobile engagement score 424 can be updated real time by continuously calculating and updating the user's patterns 204 by the pattern module 402 with the location 414 collected from the location unit 320. The mobile engagement score 424 can be seen as an indicator of how well the user's patterns 204 of the first device 102 correlate with the user's patterns 204 of all the devices of the navigation system 100 since it is a statistical analysis comparing the user's patterns 204 of the first device 102 to the mobile engagement score model 412. The mobile engagement score 424 can be used to forecast, estimate, or determine the behavior of the first device 102 based on the amount of variability, variance, difference, or standard deviation with other devices of the navigation system 100.

The modeling module 410 can incorporate the user's patterns 204 that are newly calculated or determined by the pattern module 402 with compiled data of historic long term trends from the market information module 406. The market research 408 from the market information module 406 can be used by the modeling module 410 to identify the user's patterns 204 of consumption, travel, or information usage on a longer cycle and can be used to forecast, estimate, or determine consumption, travel, or information usage such as holiday shopping, fiscal spending budgets, summer outdoor activities, or tax preparation. By forecasting, estimating, or determining consumption, travel, or information usage the content 206 of FIG. 2 can be formatted and selected to satisfy consumption, travel, or information usage of a user (not shown) of the first device 102.

The modeling module 410 can continuously update the mobile engagement score 424 with new information from the pattern module 402. The modeling module 410 can identify the proximity of the user's patterns 204 in terms of the location 414, time, type of information accessed, type of consumption, or a combination thereof, of other users with the user of the first device 102 and determine the likelihood that the user of the first device 102 will share an emerging need before without being aware of the need.

The modeling module 410 identifies current search terms of the first device 102. The modeling module 410 identifies search terms from the user's patterns 204 of the first device 102 and other devices. The modeling module 410 calculates the difference, variance, or deviation of the current search terms or synonyms of the current search terms, and the search terms from the user's patterns 204 of the first device 102 and other devices. The modeling module 410 can incorporate this variability, variance, difference, or standard deviation into the mobile engagement score 424.

For example, the modeling module 410 can identify the mobile engagement score 424 of the first device 102 based on the user's patterns 204 of searches for new attraction at a mall. The content 206 used by others with small deviations. The small deviations include deviations within a range. The small deviations can include locational deviations, time deviations, or informational search deviations of less than three sigma of the mobile engagement score 424 from the mobile engagement score model 412. The content 206 can be pushed to the first device 102 through the communication path 104. The content 206 may include an internal map of stores within the mall that were consumed or used based on the user's patterns 204 of historical use and others that used or requested an internal listing of the mall's stores.

The modeling module 410 can also compare the user's patterns 204 of the location 414 of the first device 102 with the location 414 of other devices of the navigation system 100. The modeling module 410 collects the location 414 of the first device 102. The modeling module 410 collects the user's patterns 204 of the location 414 from the pattern module 402. The modeling module 410 calculates the difference, variance, or deviation of the location 414 for the first device 102 currently and historically with other devices of the navigation system 100. For example, the modeling module 410 can detect a standard deviation that is larger than three sigma or a difference within a threshold and suggest the content 206 to correct this deviation.

For example, the modeling module 410 can identify other devices of the navigation system 100 with historical deviations in the location 414 of less than three sigma are congregating at a club or restaurant. The mobile engagement score 424 can be utilized to provide the content 206 to the first device 102 that can reduce the deviation by providing the location 414 of the club or restaurant, maps or directions to the club or restaurant, or advertising of the restaurant.

The modeling module 410 can generate models based on information from the pattern module 402 and the market information module 406 and can use the inputs from the pattern module 402 and the market information module 406 to recognize, steer, or develop and stimulate consumption of the content 206. The modeling module 410 can generate the mobile engagement score model 412 for a broad base including direct customers, non-customers, and customers of third-party wireless services that utilize the navigation system 100 or applications running thereon and described in detail later. The modeling module 410 can generate the mobile engagement score model 412 by incorporating the information from the pattern module 402 and the market information module 406 to provide the content 206 to the first device 102 described in detail later.

A correlation module 426 can function within the second control unit 334 of the second device 106. The correlation module 426 can be coupled to the modeling module 410 and include inputs of the mobile engagement score model 412 and the mobile engagement score 424 for the first device 102. The correlation module 426 can utilize the mobile engagement score 424 to identify and provide the content 206 correlating to the user's patterns 204 of the first device 102 described in detail later.

The correlation module 426 can also be coupled to the content 206 including an alert 428, an instruction 430, a premium upsell 432, an advertisement 434, a service 436, and a promotion 438. The alert 428 can include news, traffic hazards, and weather bulletins. The instruction 430 can include travel directions or how to articles. The premium upsell 432 can include premium services, pay services, or revenue generating services.

The advertisement 434 can include an offer of products, services, or content for sale. The service 436 can include applications, hotlines, or business information. The promotion 438 can include free or discounted goods and services, or can include popular destinations, content, or services.

The correlation module 426 can correlate the mobile engagement score 424 of the first device 102 with the content 206 being consumed by other devices of the navigation system 100 with similar mobile engagement scores as the first device 102. For example, the correlation module 426 can detect within the mobile engagement score 424 the location 414 and the orientation 416 of the first device 102. The correlation module 426 can correlate the content 206 of the mobile engagement score 424 of the first device 102 and the user's patterns 204 historically utilized by the first device 102 when the mobile engagement score 424 is within a deviation, difference, or variance range.

The correlation module 426 can forecast, estimate, or determine the consumption of the content 206 based on the mobile engagement score 424 and the user's patterns 204 making presentation of the content effective.

The display 202 can be coupled to the correlation module 426 via the second device transmission 310 of FIG. 3 over the communication path 104. The display 202 can alternatively be coupled to the correlation module 426 when the correlation module 426 is operating on the first control unit 312 of the first device 102 through the first display interface 330 of FIG. 3 and the first control interface 322 of FIG. 3.

The correlation module 426 can push the content 206 onto the first device 102 and the display 202 formatted for the display 202 and the mobile engagement score 424 of the first device 102.

The physical transformation of change of the location 414 or the acceleration 420 of the first device 102 is captured by the user's patterns 204 and results in the mobile engagement score model 412 that changes based on the change of the location 414 or the acceleration 420 of the first device 102. The change in the mobile engagement score model 412 creates a corresponding change of the mobile engagement score model 412. The change of the mobile engagement score 424 also results in the content 206 changing, which can further modify the location 414 of the first device 102 in relation to the content 206 being displayed on the display 202. As the movement in the physical world occurs, the movement itself creates additional information captured by the user's patterns 204 incorporated by the mobile engagement score model 412 into the mobile engagement score 424 modifying the content 206 pushed to the display 202 and changing the position of the navigation system 100 in the physical world.

The modules can be implemented as a hardware implementation (not shown), in part or as a whole, in the first control unit 312 of the first device 102 or the second control unit 334 of the second device 106. The modules can also be implemented as hardware implementations or hardware units in the first device 102 or the second device 106 not within the first control unit 312 or the second control unit 334.

It has been discovered that utilizing the user's patterns 204 of the utilized in calculating the mobile engagement score model 412 and the mobile engagement score 424 provides the unexpected result of allowing providers and product manufactures to reach consumers and forecast, estimate, or determine the utilization of the content 206 for display on the first device 102.

Further it has been discovered that utilizing the user's patterns 204 to produce the mobile engagement score model 412 and the mobile engagement score 424 provides the unexpected result of allowing the first device 102 to reach and discover providers and products easily without any input into the first device 102 and allowing the content 206 of information or depictions of real world objects to be effectively utilized and quickly displayed on the display 202 of the first device 102.

Figure 5:
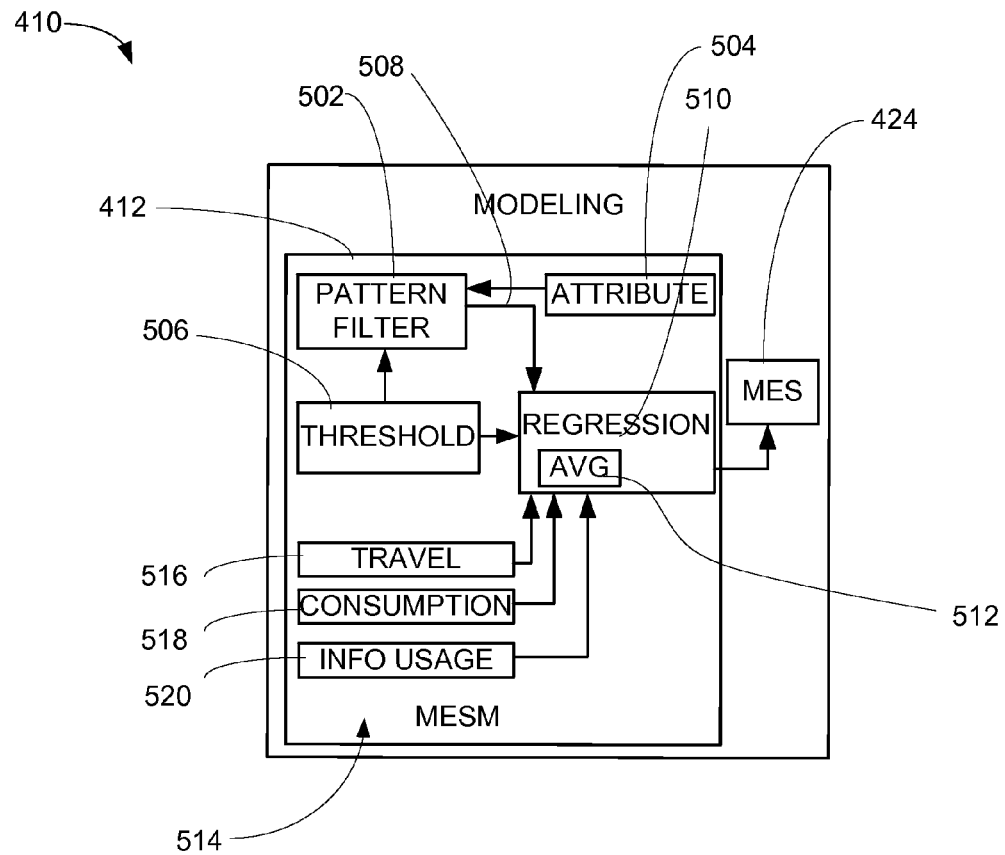
FIG. 5 is a control flow of the modeling module of FIG. 4.

Referring now to FIG. 5, therein is shown a control flow of the modeling module 410 of FIG. 4. The modeling module 410 is shown having the mobile engagement score model 412 feeding into the mobile engagement score 424. The market information module 406 of FIG. 4 and the user's patterns 204 of FIG. 2 from the pattern module 402 of FIG. 4 can be coupled to and input into to the mobile engagement score model 412.

The mobile engagement score model 412 can include a pattern filter 502. The pattern filter 502 can isolate different portions of the user's patterns 204 of the first device 102 of FIG. 1. The pattern filter 502 can isolate the user's patterns 204 from the same time of day, week, month, season, year, event, or a combination thereof. The pattern filter 502 can detect the current travel, current consumption, and current information usage from the user's patterns 204.

The pattern filter 502 can filter the user's patterns 204. For example, the pattern filter 502 can filter the user's patterns 204 based on a current attribute 504. The current attribute 504 can include the time 422 of FIG. 4, the location 414 of FIG. 4, the speed 418 of FIG. 4, the acceleration 420 of FIG. 4, or the orientation 416 of FIG. 4. The pattern filter 502 can recognize the current attribute 504 as the time 422 within ranges 506. The ranges 506 can be a classification for the general time of day, week, month, or year. The ranges 506 for time of day can determine a range time and can include morning (7 am-10 am), noon (between 10 am and 2 pm), after noon (2 pm-6 pm), night (6 pm-10 pm), late night (10 pm-4 am), and early morning (4 am-7 am). If the time 422 falls directly on a limit of the ranges 506 it can be rounded up.

The pattern filter 502 can utilize the ranges 506 for the day of week, day of month, season, or year similar to the time of day. The pattern filter 502 can isolate the user's patterns 204 from the first device 102 to those falling within the ranges 506. The pattern filter 502 can also implement the ranges 506 dynamically by applying the input of the market information module 406. The market information module 406 can emphasize the importance of certain times of travel, consumption, information usage. The market information module 406 can include preferences of consumers, the public wide. The preferences can be used by the pattern filter 502 emphasize or deemphasize the user's patterns 204 relating to the preferences of the market information module 406.

The user's patterns 204 can be disregarded if the market information module 406 indicates that the user's patterns 204 are not preferable and the user's patterns 204 are weak. The user's patterns 204 can be retained if the market information module 406 indicates that the user's patterns 204 are preferable and the user's patterns 204 are weak.

On the other hand, the user's patterns 204 can be flagged as important even when they are weak if the market information module 406 indicates that preferences of a survey indicate favorable ratings. The user's patterns 204 can be elevated from a weak classification to an intermediate or important level if the market information module 406 indicates that the user's patterns 204 can be preferable.

The pattern filter 502 inspects the user's patterns 204 and assigns locations, consumptions, and information usage synonyms. For the location 414 it may be a similar kind of the location 414, (one mall or another), for consumption it can be a similar kind of product (one type of gourmet coffee or another), and for information consumption it can be a similar kind of information (US patent searches or European patent searches). The synonyms can be contained in numerous sources such as dictionaries, thesauruses, market research databases, US business tax code classifications, or the like. These sources of synonyms can be included in the pattern filter 502 by the market information module 406. The market information module 406 can provide this type of qualitative information.

The pattern filter 502 can associate the user's patterns 204 and the synonyms of the user's patterns 204 with the market research 408 of FIG. 4 from the market information module 406. The pattern filter 502 can also use the synonyms of the user's patterns 204 to filter the user's patterns 204. The pattern filter 502 can inspect the user's patterns 204 to determine other similar travel, consumption, or information usage using the synonyms to group the user's patterns 204 and by grouping the user's patterns 204 the specific travel, consumption, and information usage becomes more apparent by summing the specific data points of the location 414, the orientation 416, the speed 418, search terms, information display times, purchases, these discrete points of information are combined. When combined the pattern filter 502 can recognize the user's patterns 204 as significant rather than simply a single point of action, or the location 414, or consumption.

The pattern filter 502 can also utilize the combination by stripping off any of the user's patterns 204 that do not have synonyms or discrete points of information that match. The pattern filter 502 can strip the user's patterns 204 for a range of times and for the range actions if it falls outside the ranges 506 of relevance either because of preferences from a survey input by the market information module 406 or because the uniqueness of the action falls below a ten percent cut off from the largest recognized action or combination of similar actions to produce an output of filtered patterns 508.

The mobile engagement score model 412 further includes a regression module 510. The regression module 510 includes the filtered patterns 508 as inputs from the pattern filter 502 as well as a user's current status 514 that includes current travel 516, current consumption 518, and current information usage 520. The regression module 510 can take the filtered patterns 508 by category defined by the synonyms of the market information module 406 and analyze them against the current travel 516 such as the location 414, the speed 418, the orientation 416, and duration of travel, the current type, amount, and frequency of the current consumption 518, or the current information usage 520 such as type, duration, or frequency of the current information usage 520. The current travel 516 can be coupled to the location unit 320 of FIG. 3 to input current travel information via global positioning satellites.

The regression module 510 can calculate a weighted average 512 output to the mobile engagement score 424 as the weighted average 512 of the current travel 516, the current consumption 518, or the current information usage 520 from the filtered patterns 508 of the pattern filter 502. The filtered patterns 508 having deviations from the current travel 516, the current consumption 518, or the current information usage 520 falling outside the ranges 506 can be disregarded.

The mobile engagement score 424 can be a unique identifier or can be shared with others. The mobile engagement score 424 can change in real time based on any input into the mobile engagement score model 412 including inputs from the market information module 406 of a new consumer study or updated classification charts, from the current travel 516 of the location 414 that is new or the orientation 416 that is new, from the current consumption 518 of a new purchase or advertisement response, from the current information usage 520 of a new search term or information link selection of the linked options 214 of FIG. 2. The mobile engagement score 424 and the filtered patterns 508 can be fed to the correlation module 426 of FIG. 4 for further processing.

Figure 6:
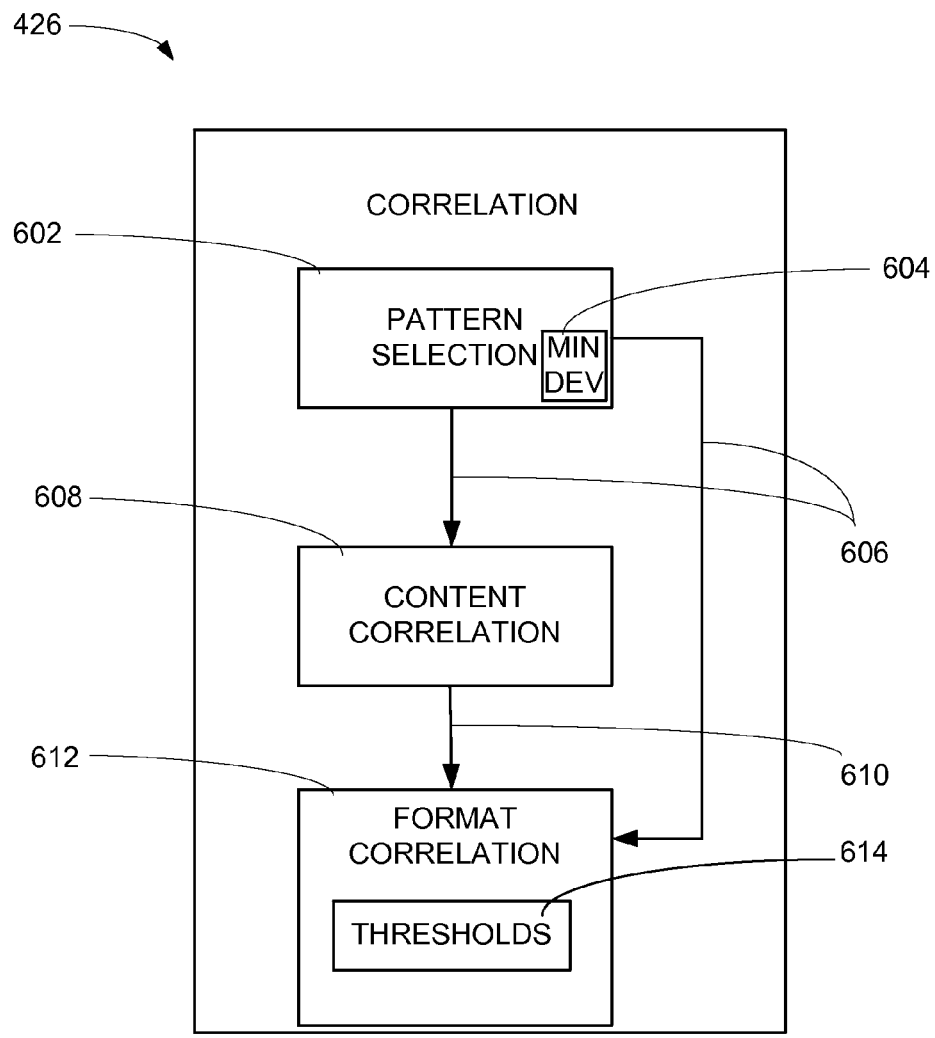
FIG. 6 is a control flow of the correlation module of FIG. 4.

Referring now to FIG. 6, therein is shown a control flow of the correlation module 426 of FIG. 4. The mobile engagement score 424 of FIG. 4 is fed into a pattern selection module 602 of the correlation module 426 along with the filtered patterns 508 of FIG. 5 of the pattern filter 502 of FIG. 5. The pattern selection module 602 of the correlation module 426 inspects the mobile engagement score 424 to find a minimal deviation 604 between the mobile engagement score 424 and the filtered patterns 508 to output user's current activities 606. The minimal deviation 604 of the mobile engagement score 424 to the filtered patterns 508 indicates a very similar activity. Once this correlation is identified between the filtered patterns 508 and the mobile engagement score 424 by the pattern selection module 602, the correlation module 426 determines the content 206 of FIG. 2 that was useful or consumed during the time frame of the filtered patterns 508 and the synonyms of the filtered patterns 508 in a content correlation module 608.

The content correlation module 608 of the correlation module 426 can take the minimal deviation 604 between the filtered patterns 508 and the mobile engagement score 424 and display the content 206 that was consumed during the user's current activities 606. For instance, the filtered patterns 508 indicating a train travel will use information or consume products at the terminals, so displaying information about or near a terminal opposed to information about the nearest attractions will be useful, and will be determined by the user's current activities 606 that correlate to the content determined by the content correlation module 608.

As a further example, the user's current activities 606 can be determined to include specific travel, consumption, and information usage by the content correlation module 608. The content correlation module 608 can correlate the content 206 by summing up the content 206 usage in the user's current activities 606 and determining the most frequently used portions of the content 206 to identify selected content 610. The most frequently used portions of the content 206 can also include a summation of any synonyms indicated by the market information module 406 of FIG. 4.

The pattern selection module 602 indicating a travel having the user's patterns 204 of FIG. 2 of a walking pace in a mall can be correlated by the content correlation module 608 that this type of the user's current activities 606 utilized information most often within the vicinity of a few hundred yards or used information about the mall itself. A format correlation module 612 can be coupled to the content correlation module 608 and to the pattern selection module 602 to select the appropriate format for the selected content 610 and the user's current activities 606.

The format correlation module 612 can format the selected content 610 by paring down the amount of the content 206 to what is the most useable based on the user's current activities 606. The format correlation module 612 can make the formatting decisions of what are most useable of the selected content 610 based on preset conditions.

The selected content 610 can be the most useable based on how the user's current activities 606 correlate to the filtered patterns 508. For example, when the user's current activities 606 correlate to the filtered patterns 508 or the user's patterns 204 that have synonyms that correspond to travel that includes driving, the format correlation module 612 of the correlation module 426 can select and format the content 206 to display the content 206 on the display 202 of FIG. 2 in a graphical format using high contrast and large clear symbols. As another example, when the user's current activities 606 correlate to the filtered patterns 508 or the user's patterns 204 that have synonyms that correspond to sitting in a park, the format correlation module 612 of the correlation module 426 can display the content 206 on the display 202 of the first device 102 of FIG. 1 in a textural format similar to a book or a newspaper.

The format correlation module 612 of the correlation module 426 can modify the type of the content 206 as well as the format of the content 206 based on the type of travel 404 of FIG. 4 or the synonyms of the type of travel 404 identified as the user's patterns 204 of the pattern selection module 602. This can be hard coded in the format correlation module 612 of the correlation module 426. The format correlation module 612 of the correlation module 426 can include ranges 614 for driving, walking, or sitting. The ranges 614 can be based on the location 414 of FIG. 4 and the speed 418 of FIG. 4 of movement. Locations of a road at speeds above five miles per hour can indicate driving. Locations of a train track at speeds above five miles per hour can indicate sitting on a train. Locations of a road or train track at speeds below five miles per hour but greater than one mile per hour can indicate walking. Locations of a road or train track at speeds below one mile per hour can indicate standing or sitting.

When the format correlation module 612 detects standing or sitting the format correlation module 612 will format the selected content 610 to be displayed in a dense format. When the format correlation module 612 detects walking the selected content 610 can be formatted to be displayed with greater than ten point font. When the format correlation module 612 detects driving the selected content 610 can be displayed in the graphical format 210 of FIG. 2 that utilizes at least seventy five percent of the screen as graphical depictions of the content 206 and fewer than twenty words. Also if the format correlation module 612 indicates the user's patterns 204 correspond to driving the format correlation module 612 will prioritize the selected content 610 to display mostly the graphical depictions of the content 206 and any of the content 206 over the twenty word limit will be discarded.

Figure 7:
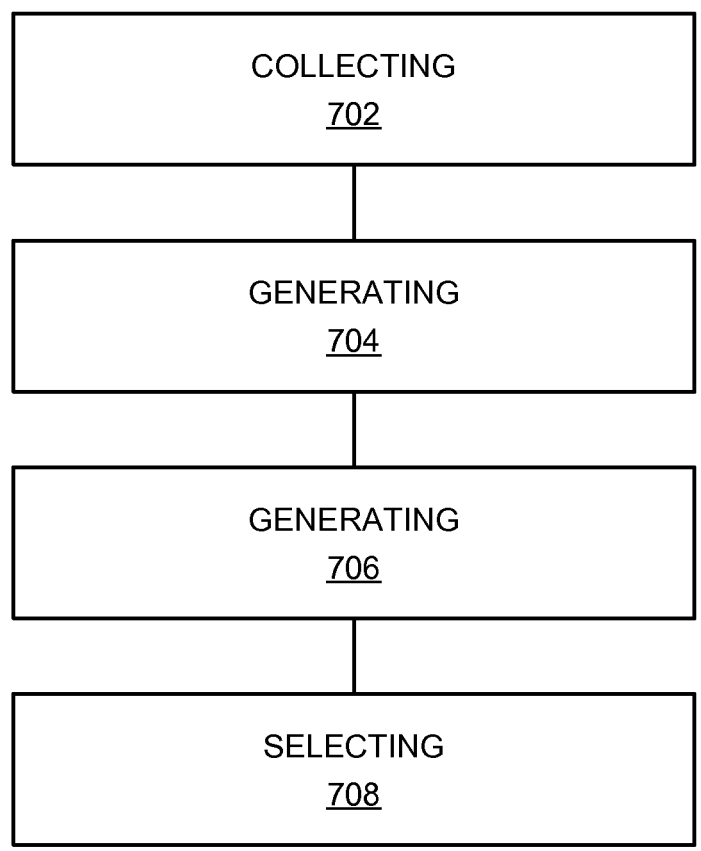
FIG. 7 is a flow chart of a method of operation of the navigation system of FIG. 1 in a further embodiment of the present invention.

Referring now to FIG. 7, therein is shown a flow chart of a method 700 of operation of the navigation system 100 of FIG. 1 in a further embodiment of the present invention. The method 700 includes: collecting a user's pattern in a block 702; generating a filtered pattern by filtering the user's pattern with a current attribute in a block 704; generating a mobile engagement score by calculating a weighted average from the filtered pattern and a user's current status in a block 706; selecting a content based on the mobile engagement score for displaying on a device in a block 708.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    collecting a user's pattern;
    generating a filtered pattern by filtering the user's pattern with a current attribute;
    generating a mobile engagement score by calculating a weighted average from the filtered pattern and a user's current status; and
    selecting a content based on the mobile engagement score for displaying on a device.

2. The method as claimed in claim 1 wherein selecting the content includes selecting linked options.

3. The method as claimed in claim 1 wherein generating the mobile engagement score includes calculating the mobile engagement score based on the user's current status, which includes a current travel, a current consumption, a current information usage, or a combination thereof.

4. The method as claimed in claim 1 further comprising:
    determining a user's current activity by calculating a minimal deviation between the filtered pattern and the mobile engagement score; and
    filtering the content based on the user's current activity.

5. The method as claimed in claim 1 wherein selecting the content includes selecting an alert, an instruction, a premium upsell, an advertisement, an offer of a service, a promotion, or a combination thereof.

6. A method of operation of a navigation system comprising:
    collecting a user's pattern;
    generating a filtered pattern by filtering the user's pattern with a current attribute;
    generating a mobile engagement score by calculating a weighted average from the filtered pattern and a user's current status;
    identifying a selected content by determining a content most frequently used during the filtered pattern; and formatting the selected content based on a user's current activity for displaying on a device.

7. The method as claimed in claim 6 wherein formatting the selected content includes formatting the selected content in a dense layout when the user's current activity is motionless.

8. The method as claimed in claim 6 wherein identifying the selected content includes selecting an event corresponding to a current location of the user's current activity.

9. The method as claimed in claim 6 wherein formatting the selected content includes formatting the selected content in a graphical format when the user's current activity is driving.

10. The method as claimed in claim 6 wherein formatting the selected content includes pairing down the amount of the selected content to what is the most useable based on the user's current activity.

11. A navigation system comprising:
   a pattern module for collecting a user's pattern;
   a pattern filter, coupled to the pattern module, for generating a filtered pattern by filtering the user's pattern with a current attribute;
   a regression module, coupled to the pattern filter, for generating a mobile engagement score by calculating a weighted average from the filtered pattern and a user's current status; and
   a content correlation module, coupled to the pattern module, for selecting a content based on the mobile engagement score for displaying on a device.

12. The system as claimed in claim 11 wherein the content correlation module is for selecting linked options.

13. The system as claimed in claim 11 wherein the regression module is for calculating the mobile engagement score based on the user's current status, which includes a current travel, a current consumption, a current information usage, or a combination thereof.

14. The system as claimed in claim 11 further comprising:
   a pattern selection module, coupled to the content correlation module, for determining a user's current activity by calculating a minimal deviation between the filtered pattern and the mobile engagement score; and
wherein:
   the content correlation module is for filtering the content based on the user's current activity.

15. The system as claimed in claim 11 wherein the content correlation module is for selecting an alert, an instruction, a premium upsell, an advertisement, an offer of a service, a promotion, or a combination thereof.

16. The system as claimed in claim 11 wherein:
   the content correlation module is for identifying a selected content by determining a content most frequently used during the filtered pattern; and
further comprising:
   a format correlation module, coupled to the content correlation module, for formatting the selected content based on a user's current activity for displaying on a device.

17. The system as claimed in claim 16 wherein the format correlation module is for formatting the selected content in a dense layout when the user's current activity is motionless.

18. The system as claimed in claim 16 wherein the content correlation module is for selecting an event corresponding to a current location of the user's current activity.

19. The system as claimed in claim 16 wherein the format correlation module is for formatting the selected content in a graphical format when the user's current activity is driving.

20. The system as claimed in claim 16 wherein the format correlation module is for pairing down the amount of the selected content to what is the most useable based on the user's current activity.

* * * * *